US012129991B2

(12) United States Patent
Cacciabeve

(10) Patent No.: US 12,129,991 B2
(45) Date of Patent: Oct. 29, 2024

(54) FLEXIBLE MAT LIGHT

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

(21) Appl. No.: 18/373,509

(22) Filed: Sep. 27, 2023

(65) Prior Publication Data

US 2024/0102635 A1 Mar. 28, 2024

Related U.S. Application Data

(60) Provisional application No. 63/410,839, filed on Sep. 28, 2022.

(51) Int. Cl.
*F21V 17/10* (2006.01)
*F21V 21/096* (2006.01)
*F21V 21/30* (2006.01)

(52) U.S. Cl.
CPC .......... *F21V 17/107* (2013.01); *F21V 21/096* (2013.01); *F21V 17/105* (2013.01); *F21V 21/0965* (2013.01); *F21V 21/30* (2013.01)

(58) Field of Classification Search
CPC ...... F21V 17/107; F21V 17/005; F21V 17/02; F21V 17/105; F21V 21/0816; F21V 21/08; F21V 21/30; F21V 21/0965; F21V 14/025; F21L 4/02; F21L 4/04; F21L 4/00
See application file for complete search history.

(56) References Cited

U.S. PATENT DOCUMENTS

2003/0232175 A1* 12/2003 Zahler ................ A47G 27/0231 428/163
2005/0210722 A1* 9/2005 Graef .................... G09F 9/3026 345/82
2005/0265035 A1* 12/2005 Brass .................. F21V 23/0435 362/451
2011/0254470 A1* 10/2011 Penoyer .................. F21S 2/005 362/183
2014/0218910 A1* 8/2014 Mitchell ................ F21V 29/15 362/235
2014/0334155 A1* 11/2014 Christ .................. F21V 21/406 362/249.03
2016/0178186 A1* 6/2016 Kusunoki ............... F21V 29/70 362/373
2016/0215966 A1* 7/2016 Heller ................. F21V 21/0808

(Continued)

*Primary Examiner* — Peggy A Neils
*Assistant Examiner* — James M Endo
(74) *Attorney, Agent, or Firm* — Breiner & Breiner, L.L.C

(57) ABSTRACT

A flexible mat light having a mat and a light. The mat includes a top and a base connected by hinges having at least one living hinge. The top of the mat includes an outer shell adapted to mount the light and protect the light. The mat and base may include magnets to attach the light to a metal surface or when folding the top and base of the mat through the living hinges to place the light in a carrying mode. Due to the flexibility of the mat, the light may be placed in a standing position wherein the light may be directed in multiple positions; or the light may be placed in a carrying mode; or the light may be attached to a metal surface, the low-profile of the light allowing it to be out of the work area; or the light may include a hook for hanging the light near the work area.

17 Claims, 18 Drawing Sheets

(56) References Cited

U.S. PATENT DOCUMENTS

| | | | | |
|---|---|---|---|---|
| 2018/0058671 | A1* | 3/2018 | Cramer | F21L 4/027 |
| 2018/0224101 | A1* | 8/2018 | Qiu | F21V 21/06 |
| 2019/0093867 | A1* | 3/2019 | Qiu | F21L 4/04 |
| 2019/0285257 | A1* | 9/2019 | Gall | F21V 21/30 |
| 2019/0353332 | A1* | 11/2019 | You | F21V 15/01 |

* cited by examiner

FIG. 3
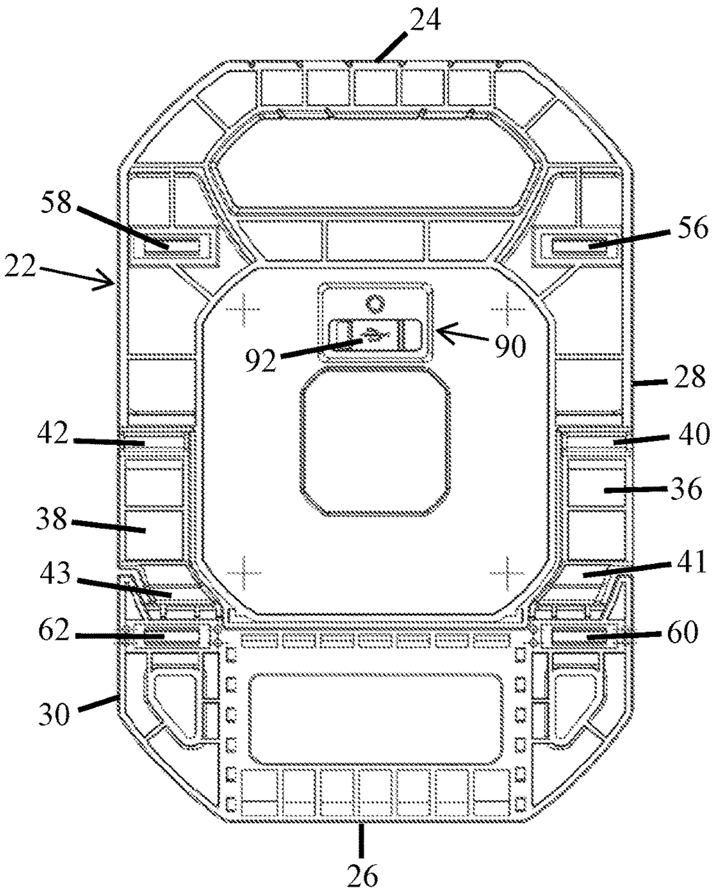
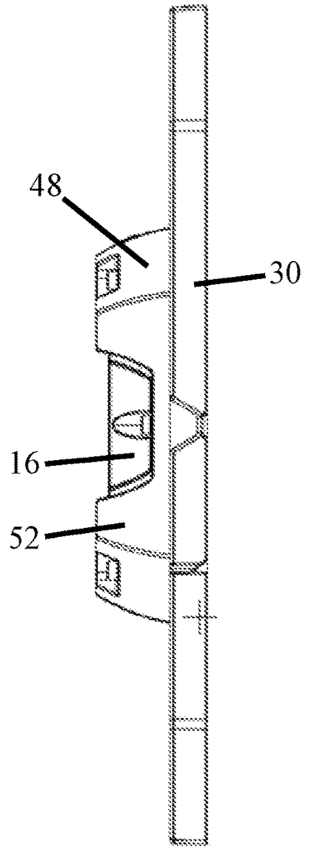
FIG. 4
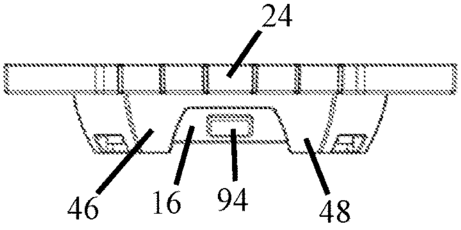
FIG. 5
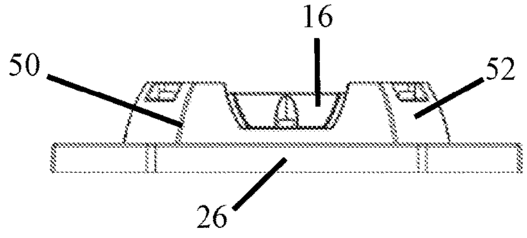
FIG. 6

FIG. 7C
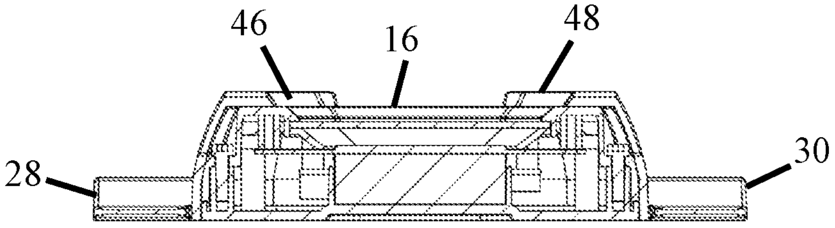
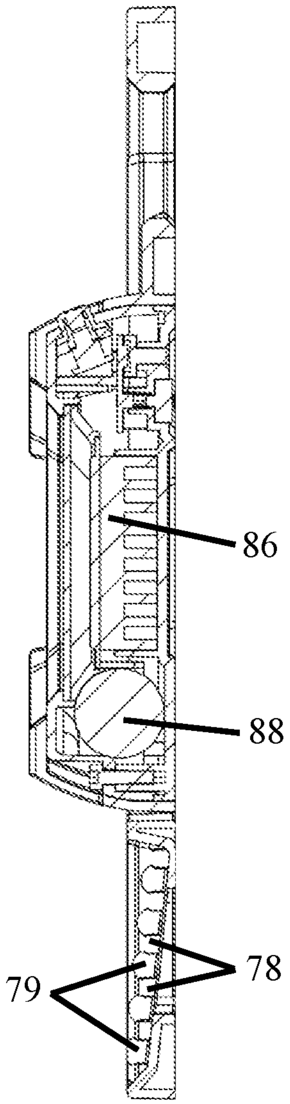
FIG. 7B
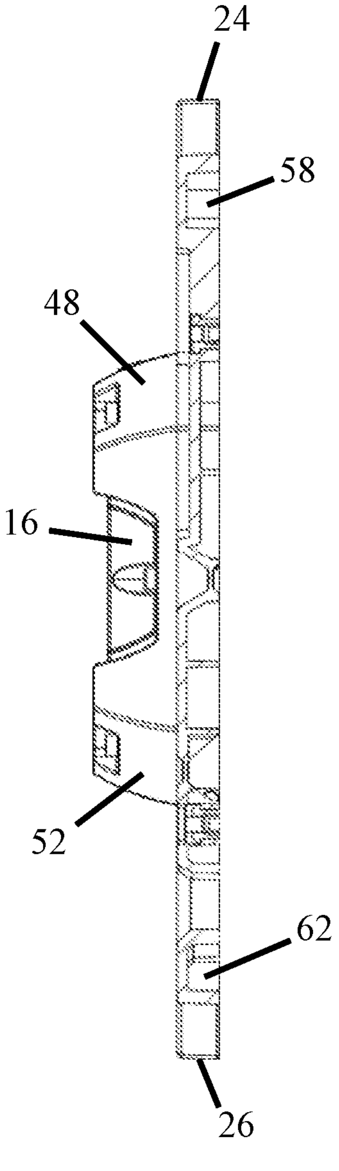
FIG. 7D

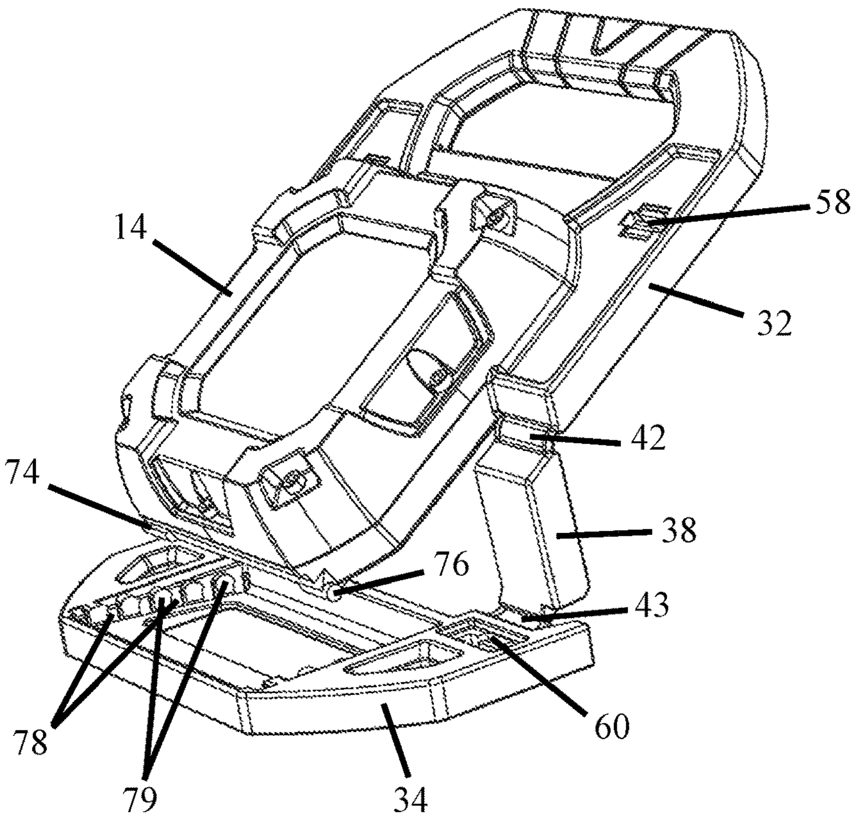
FIG. 9A
FIG. 9B
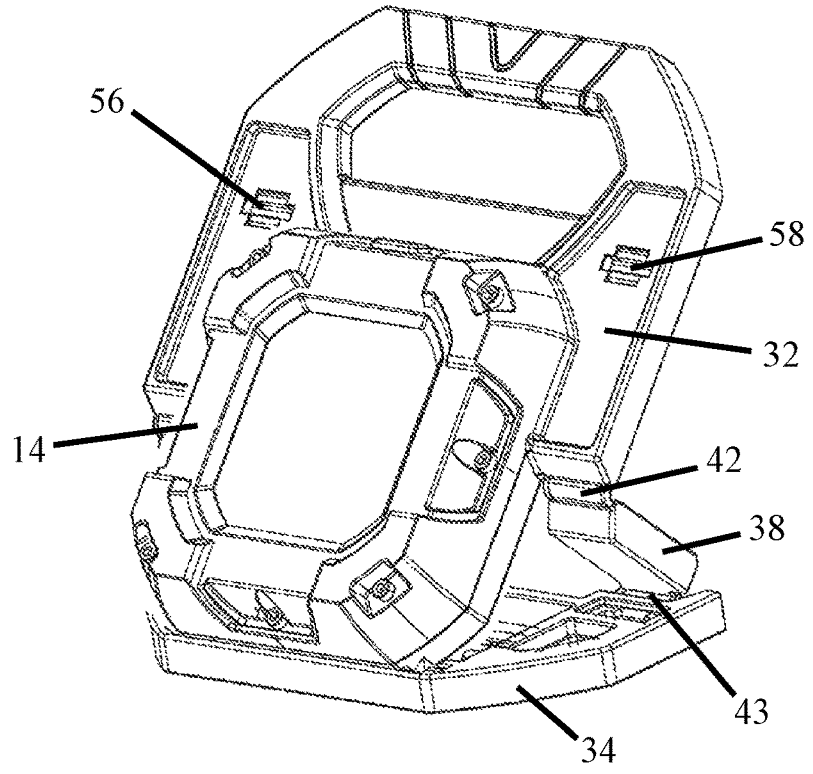

FIG. 19
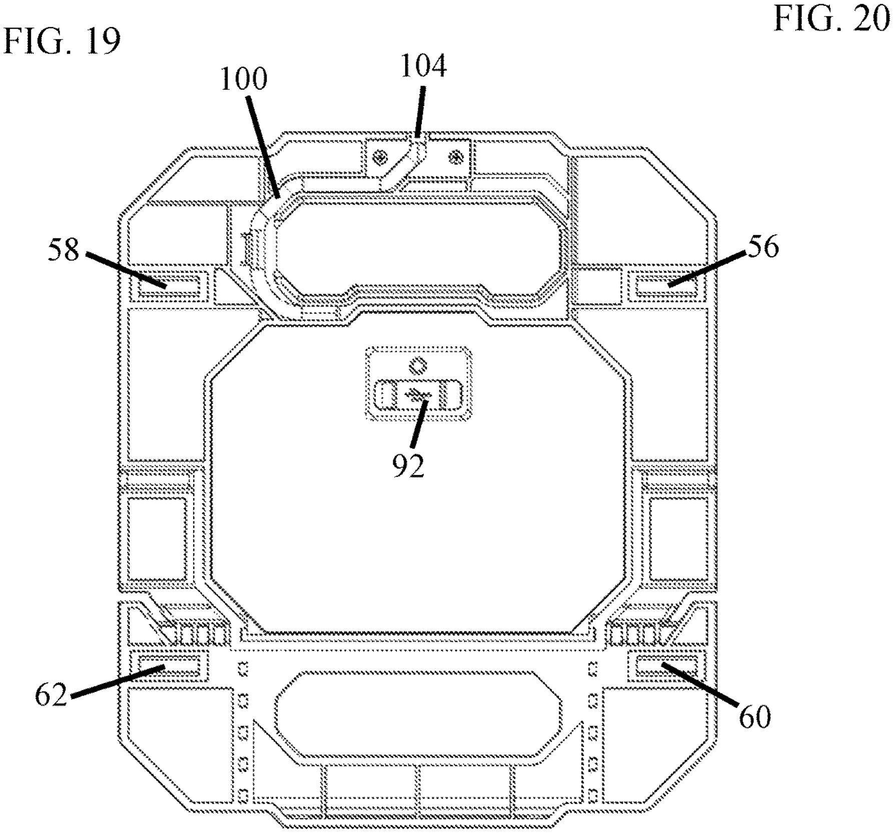
FIG. 20
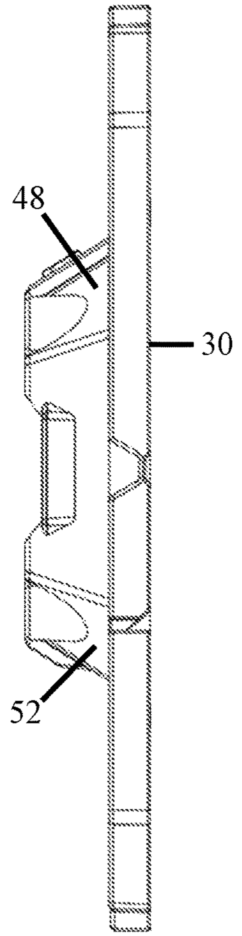
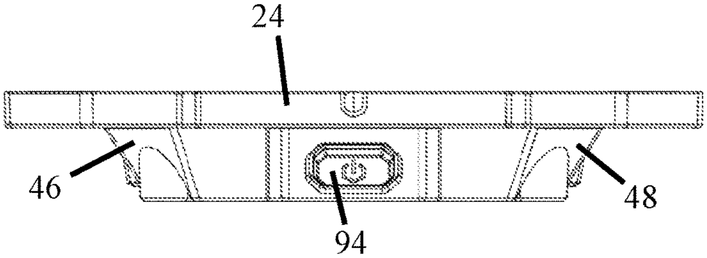
FIG. 21
FIG. 22
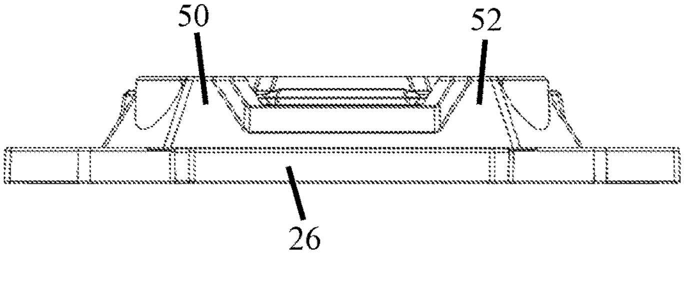

FIG. 27
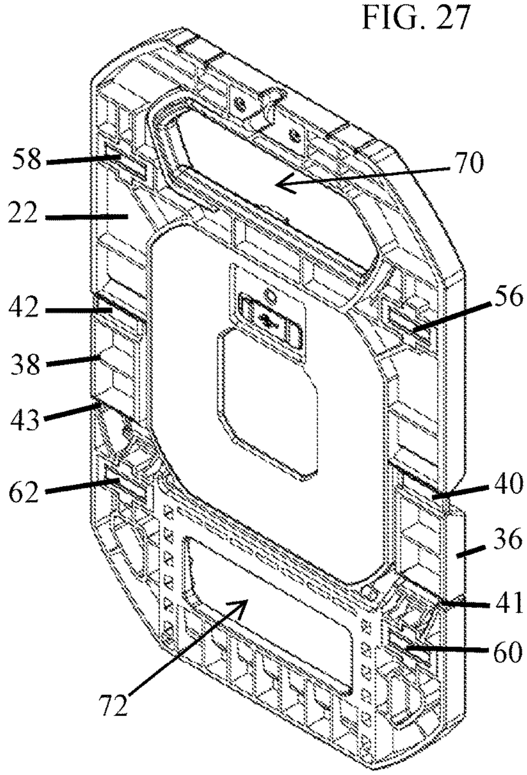
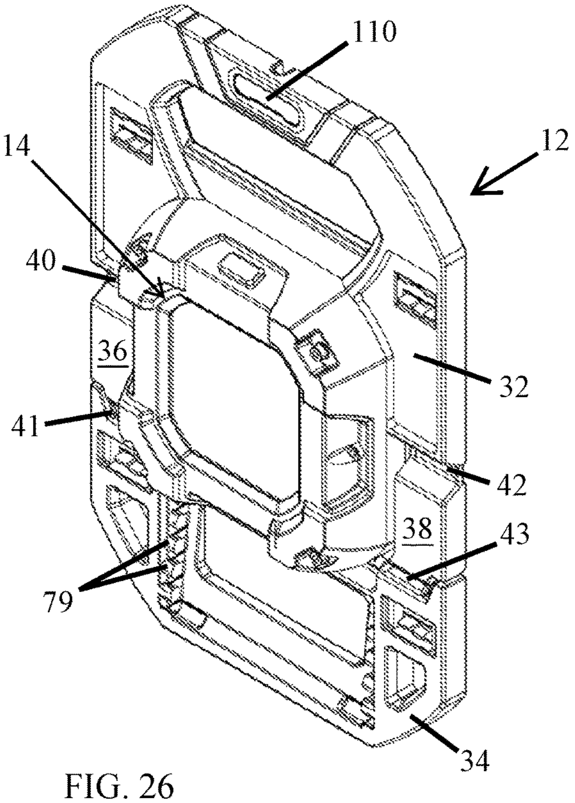
FIG. 26
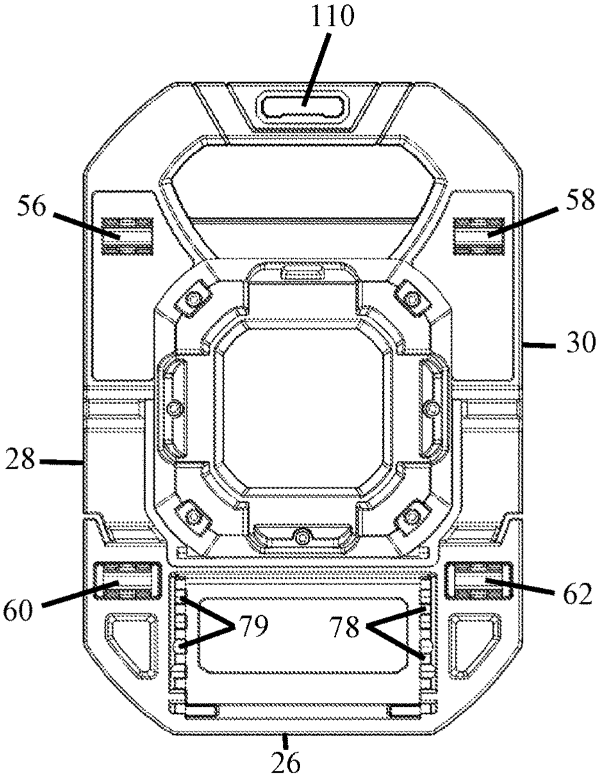
FIG. 28

FLEXIBLE MAT LIGHT

RELATED APPLICATION

This application claims benefit of U.S. Provisional Application Ser. No. 63/410,839, filed Sep. 28, 2022, entitled "Flexible Mat Light," which application is incorporated herein by reference in its entirety.

FIELD OF THE INVENTION

The present invention relates to a flexible mat light. More particularly, the invention relates to a flexible mat light wherein the light is low-profile and made of a flexible elastomer and having one or more living hinges allowing the light to be oriented in a number of different positions.

BACKGROUND OF THE INVENTION

There are no known flexible mat lights.

Various types of lights are known. Such lights are not flexible and/or low-profile.

Applicant has developed other flexible magnetic products directed to tools, including as set forth in U.S. Pat. No. 11,504,843, entitled "Flexible Magnetic Socket Holder;" U.S. application Ser. No. 17/897,859, entitled "Flexible Magnetic Mat;" U.S. application Ser. No. 17/950,669, entitled "Flexible Magnetic Wrench Holder;" and U.S. application Ser. No. 18/239,585, entitled "Flexible Magnetic Spray Can Holder," which patent and applications are incorporated herein by reference in their entireties.

While these known lights provide certain benefits, improvement is useful. The present invention provides an improved and useful light.

SUMMARY OF THE INVENTION

A primary object of the present invention is to provide a flexible mat light. The flexible mat light is a low-profile work light. The mat portion of the light is made of a flexible elastomer such as a thermoplastic polyester elastomer (TPEE). The flexible material will bend, thereby, providing an array of positions in which the light may be oriented. The light includes a living hinge which allows the light to be folded into multiple positions. The light may include magnets to attach the light to a metal surface.

The light is in an ABS (acrylonitrile butadiene styrene) housing. The hard ABS housing protects the light components, including the electronics, the battery, the COB light and lens, and provides a place for the on/off switch and charging port.

The flexible mat light comprises a mat and a light, the mat having a top and a base connected by hinges having at least one living hinge. The top of the mat includes an outer shell adapted to mount the light and protect the light. The mat and base may include magnets to attach the light to a metal surface or when folding the top and base of the mat through the living hinges to place the light in a carrying mode. Accordingly, due to the flexibility of the mat, the light may be placed in a standing position wherein the light may be directed in multiple positions; or the light may be placed in a carrying mode; or the light may be attached to a metal surface, the low-profile of the light allowing it to be out of the work area; or the light may include a hook for hanging the light near the work area.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

FIG. 2-6 are front, back, side, top and bottom views, respectively, of the light of FIG. 1.

FIGS. 9A-9D are functional views of the light of FIG. 1 showing different positions of the mat and the light.

FIGS. 18-22 are front, back, side, top and bottom views, respectively, of the light of FIG. 17.

FIG. 26 is a front perspective view of a fourth embodiment of the flexible mat light of the invention.

FIG. 27 is a back perspective view of the light of FIG. 26.

FIGS. 28-32 are a front, back, side, top and bottom views of the light of FIG. 26.

DETAILED DESCRIPTION OF THE PREFERRED EMBODIMENTS

Figure 1:
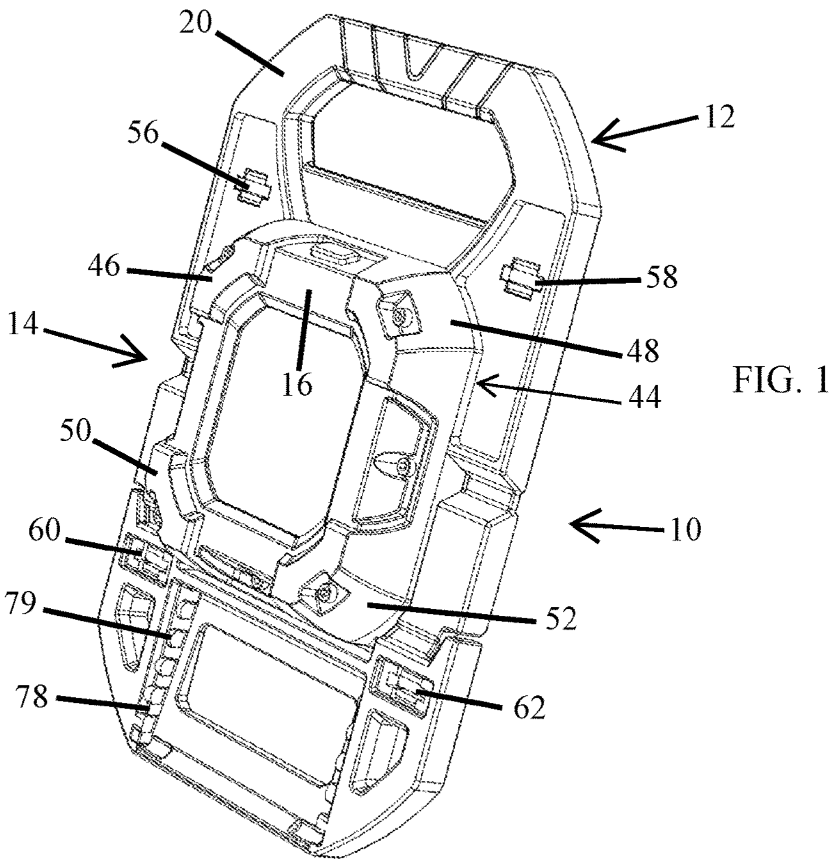
FIG. 1 is a perspective view of a first embodiment of the flexible mat light invention.
Figure 2:
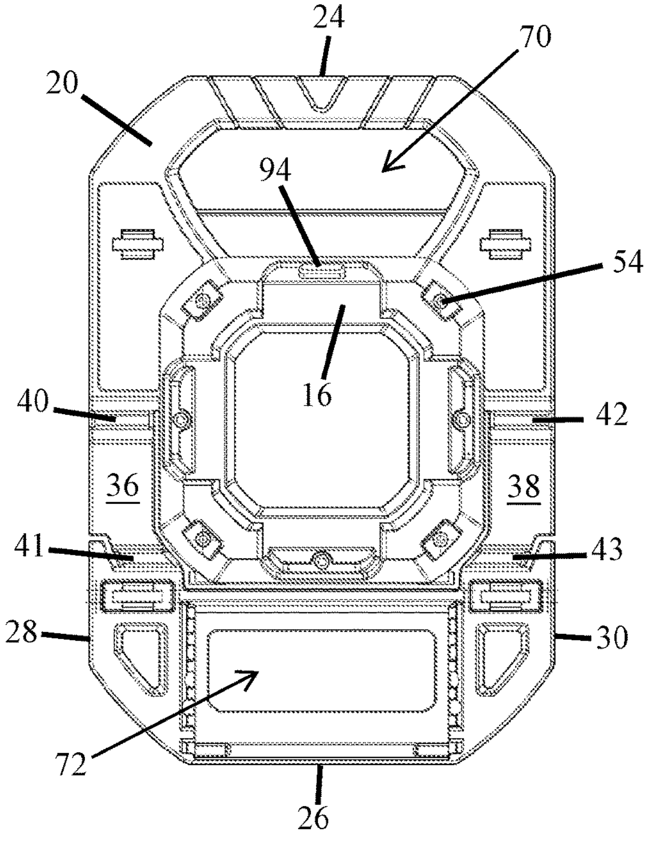
Figure 7A:
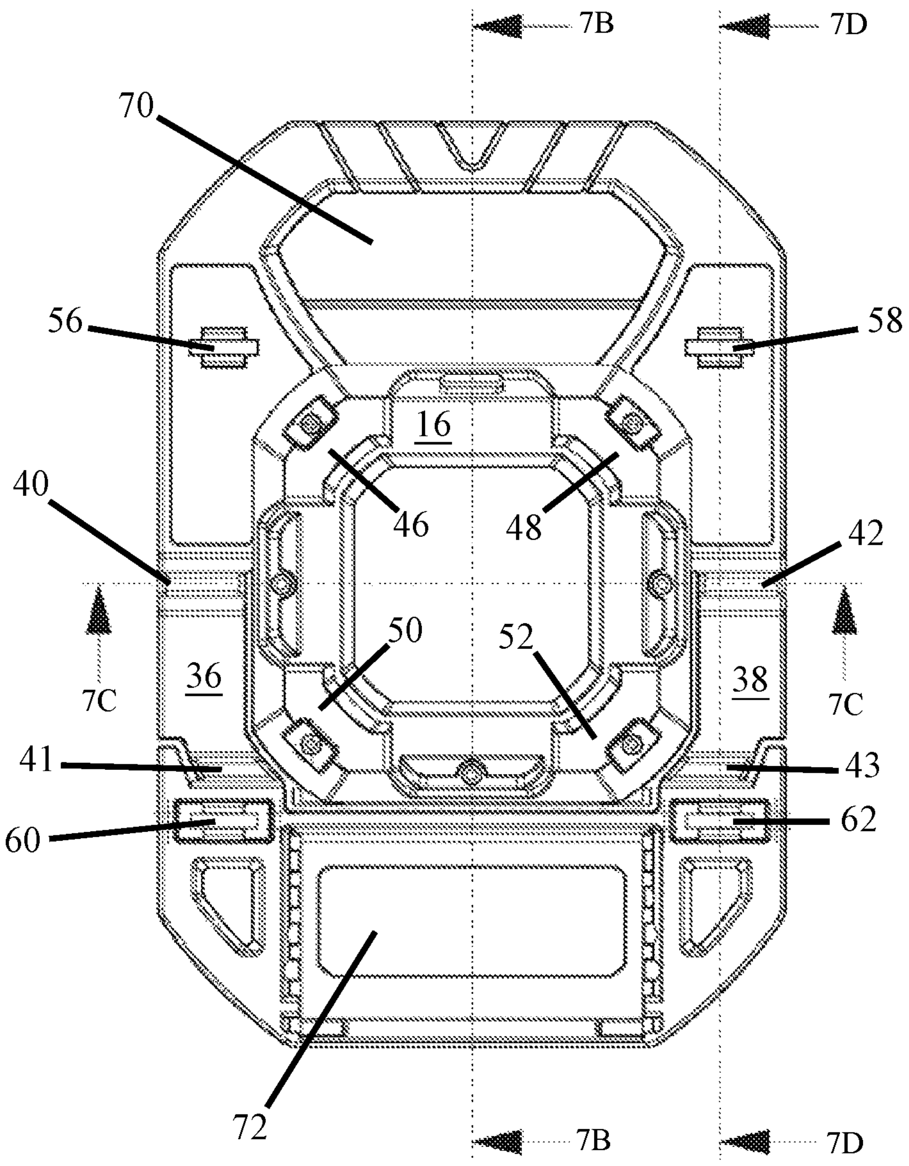
FIG. 7A is a front view of the light of FIG. 1 and FIGS. 7B-7D are a cross-sections of the light of FIG. 7A.
Figure 8:
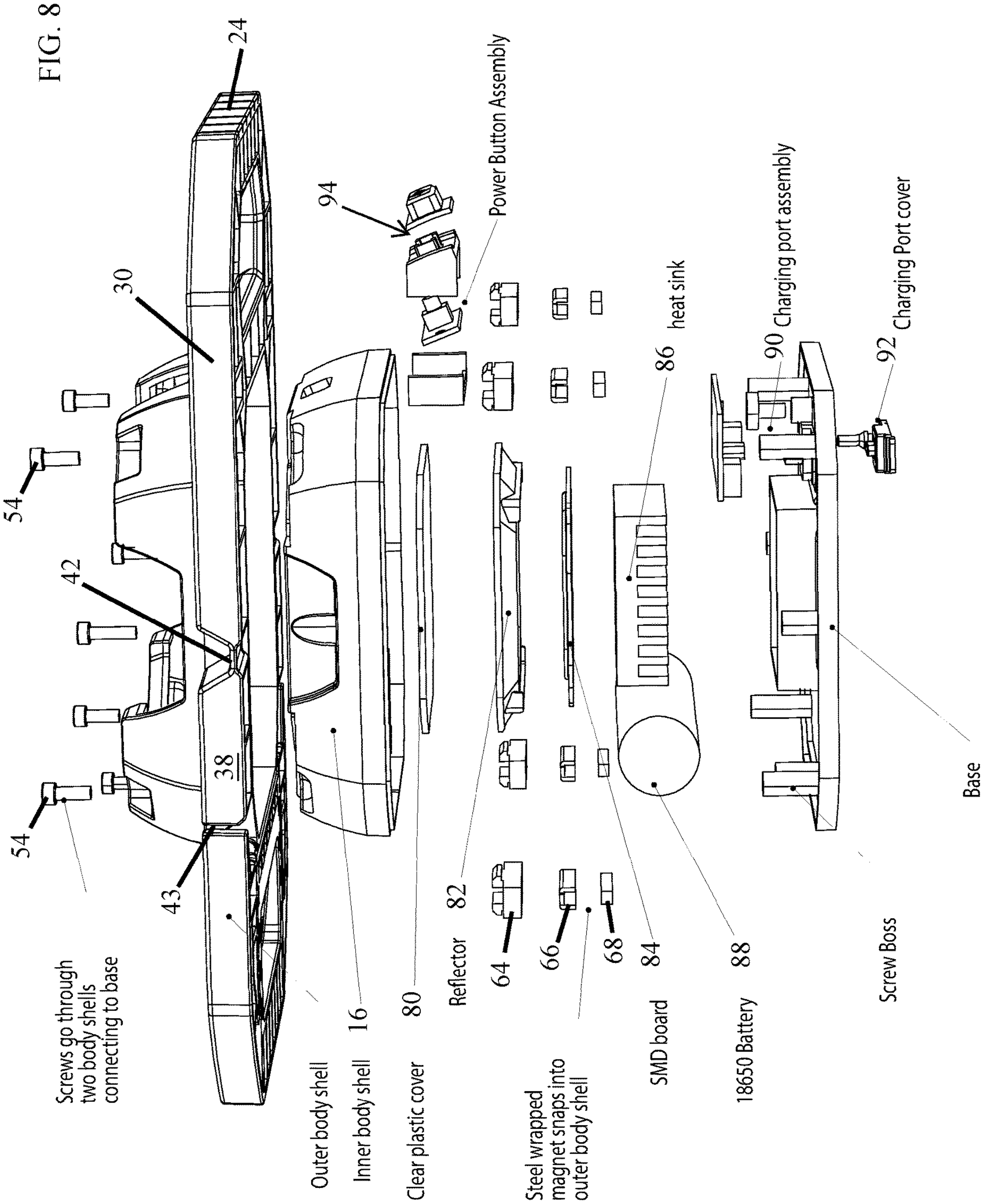
FIG. 8 is an exploded view of the light of FIG. 1.
Figure 9C:
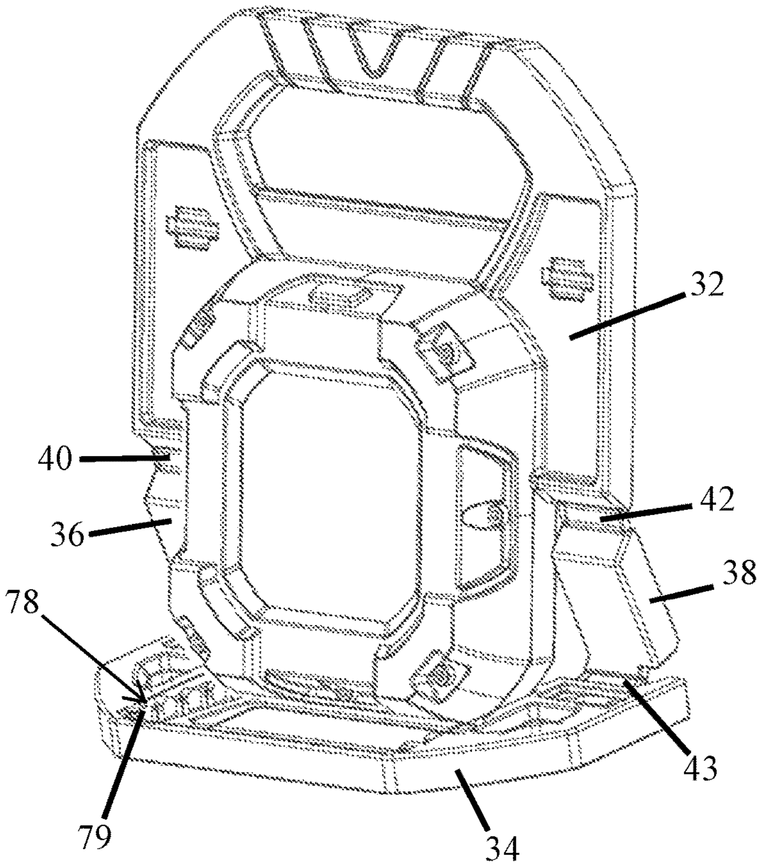
Figure 9D:
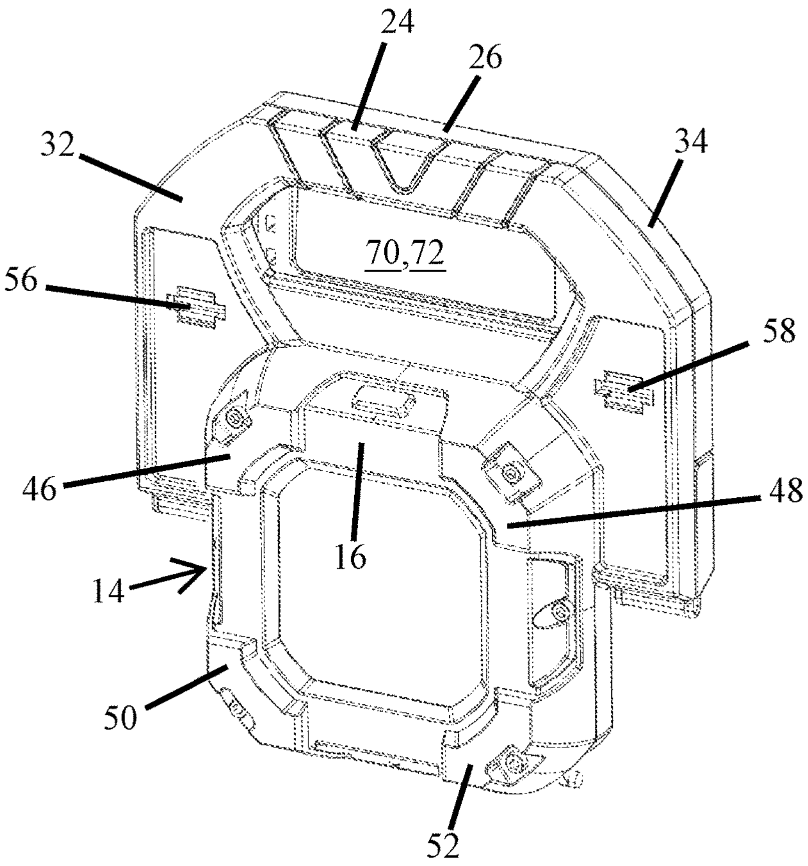
Figure 10:
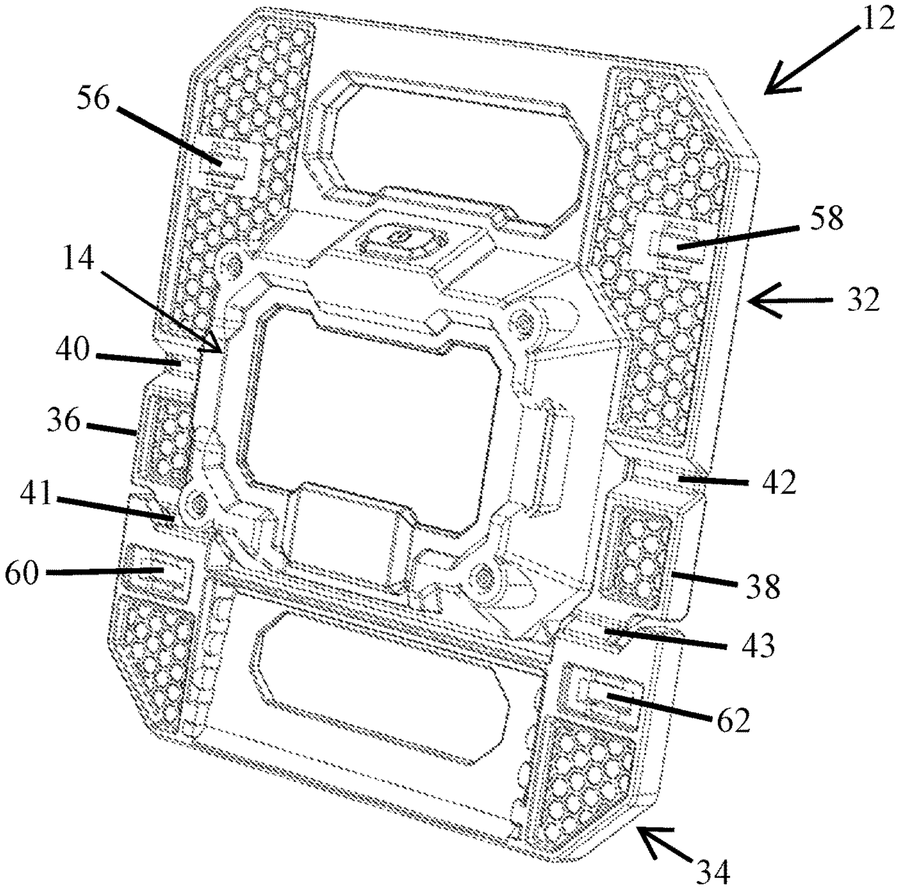
FIG. 10 is a perspective view of a second embodiment of the flexible mat light of the invention.
Figure 11:
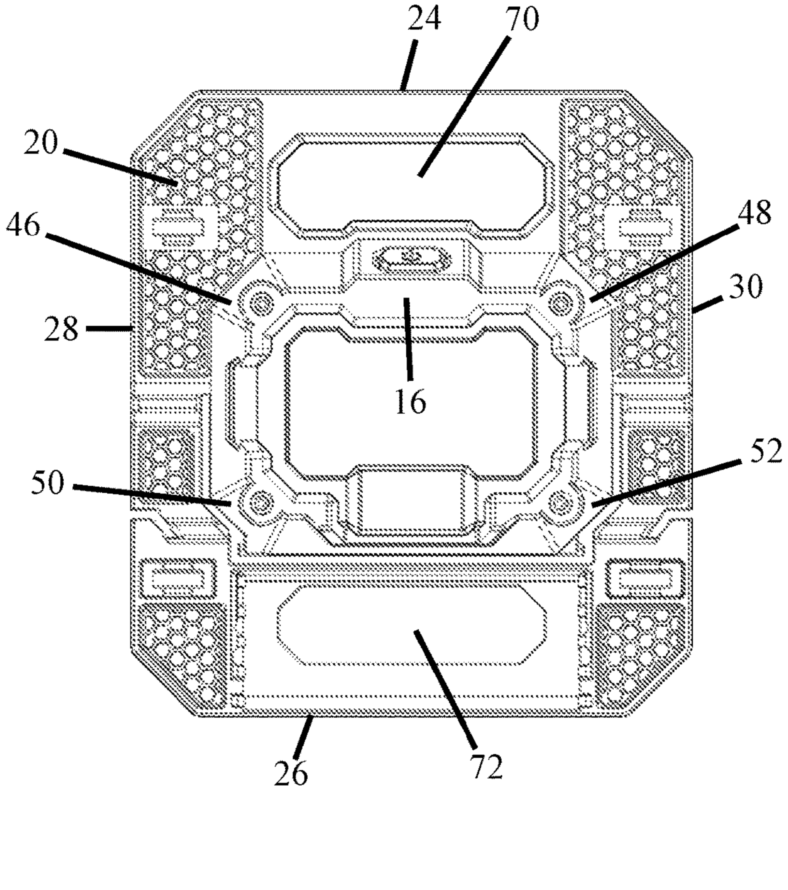
FIGS. 11-15 are front, back, side, top and bottom views, respectively, of the light of FIG. 10.
Figure 12:
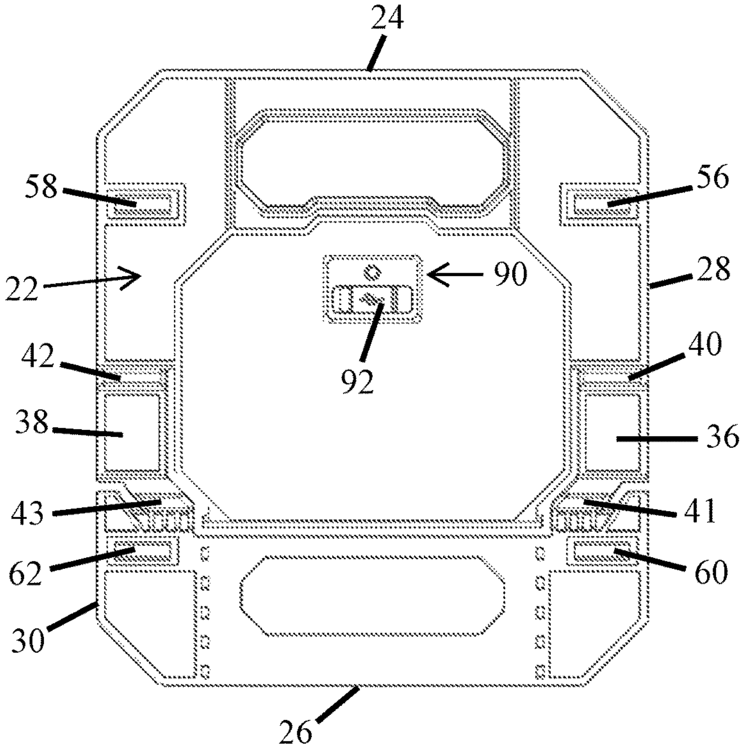
Figure 13:
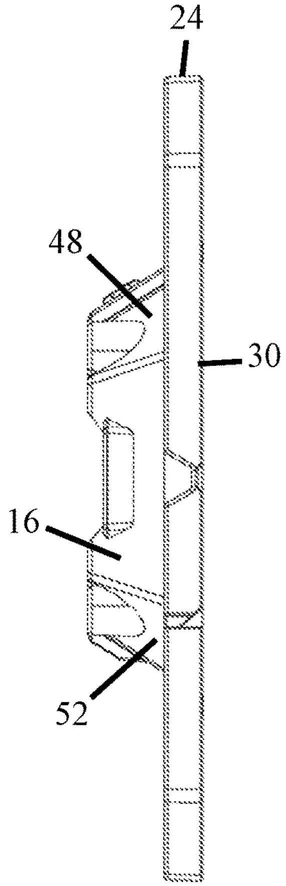
Figure 14:
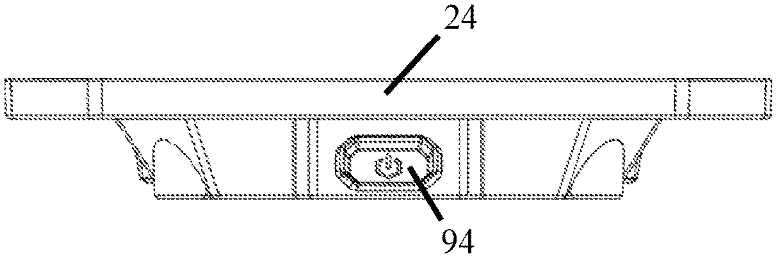
Figure 15:
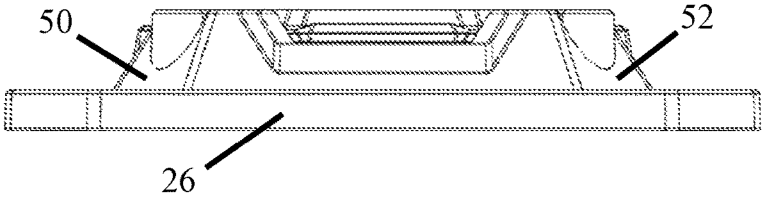
Figure 16:
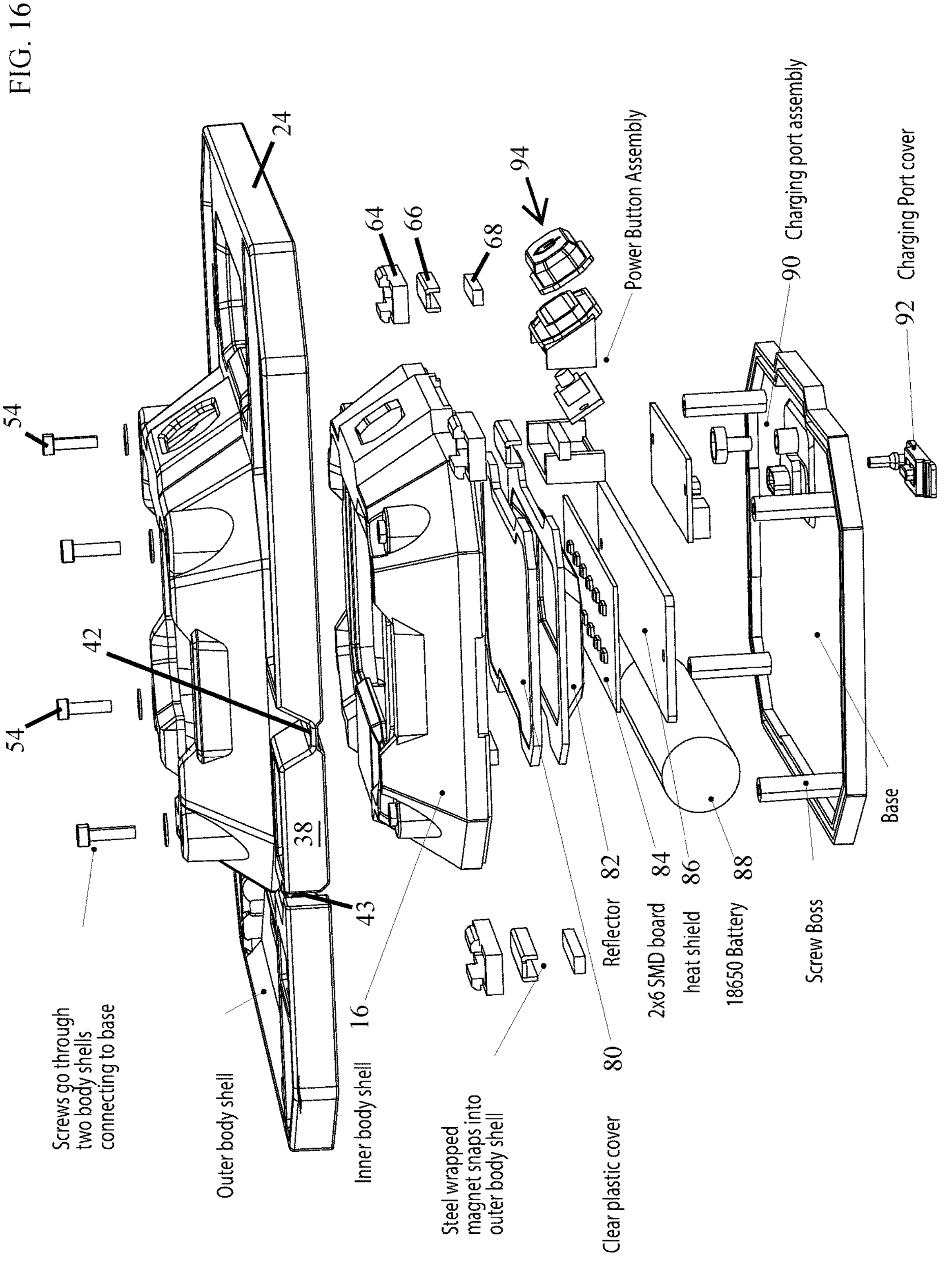
FIG. 16 is an exploded view of the light of FIG. 10.
Figure 17:
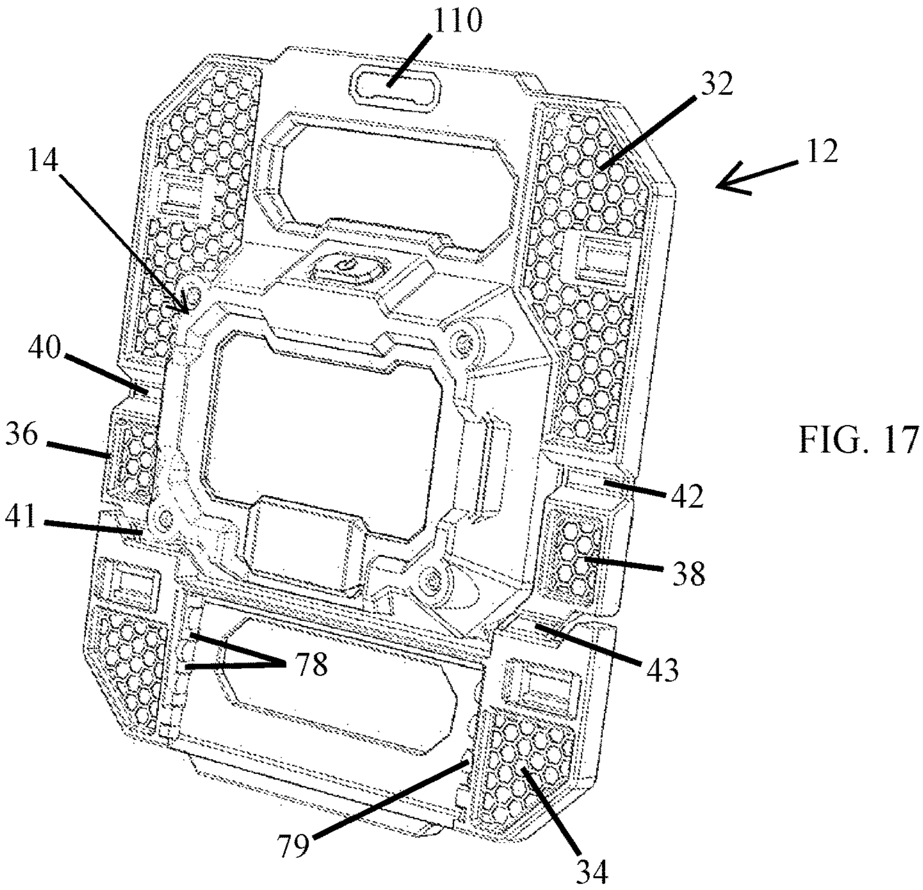
FIG. 17 is a perspective view of a third embodiment of the flexible mat light of the invention.
Figure 18:
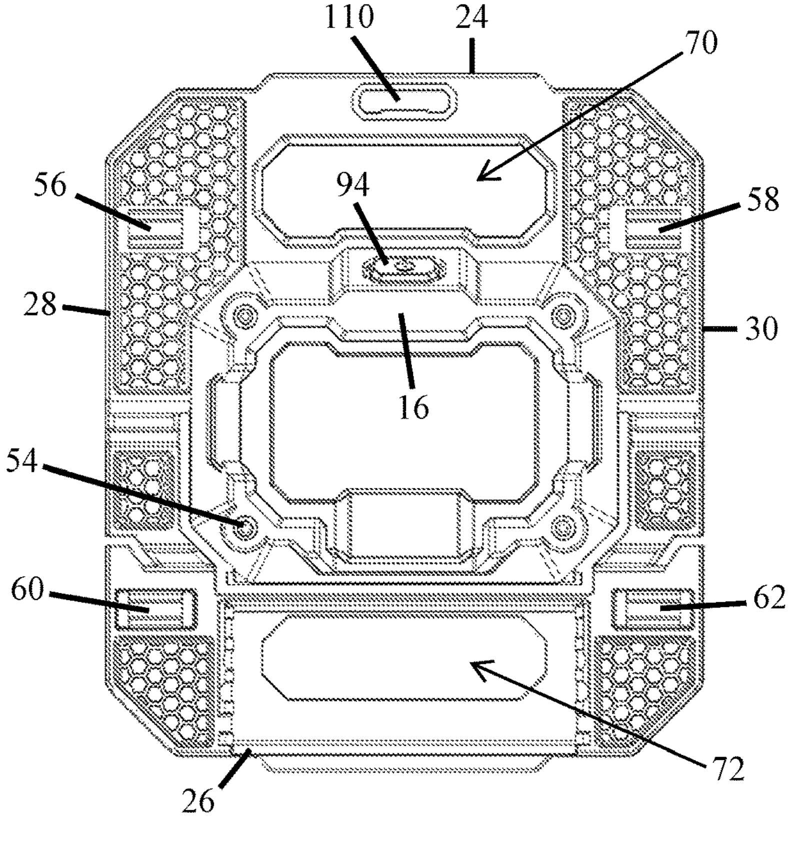
Figure 23A:
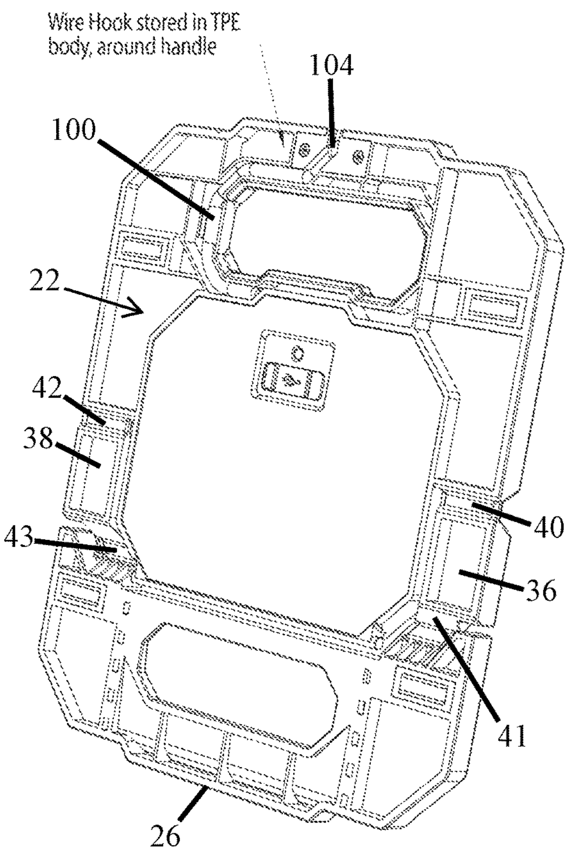
FIGS. 23A and 23B are perspective back views of the light of FIG. 17 and showing the hook of the light.
Figure 23B:
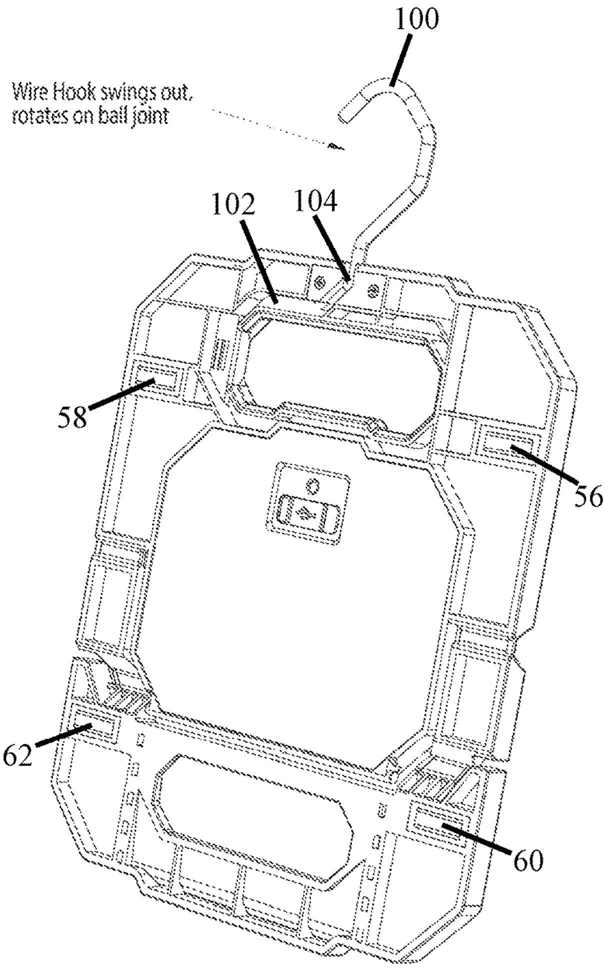
Figure 24A:
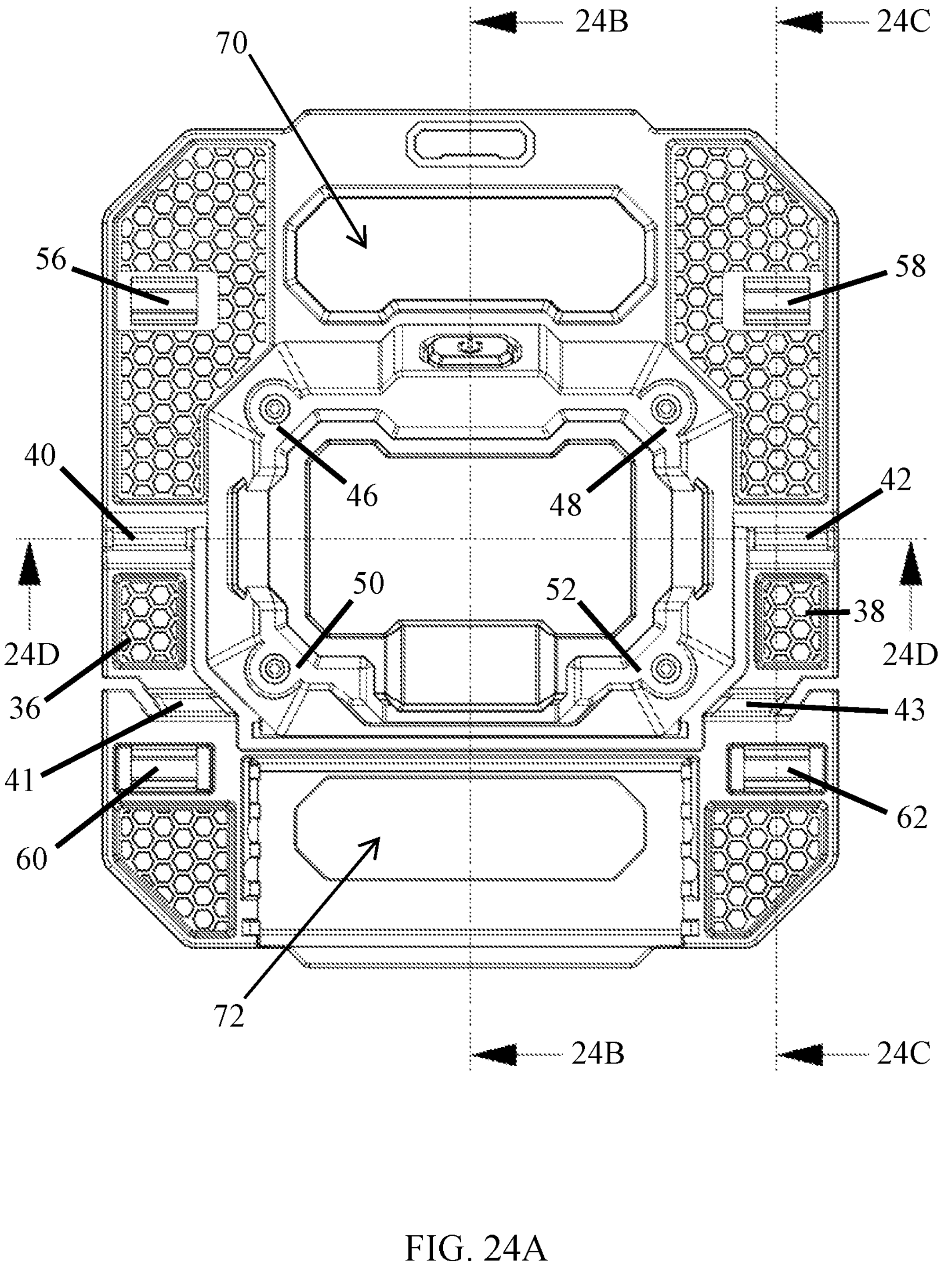
FIG. 24A is a front view of the light of FIG. 17 and FIGS. 24B-24D are cross-sections of the light of FIG. 24A.
Figure 24B:
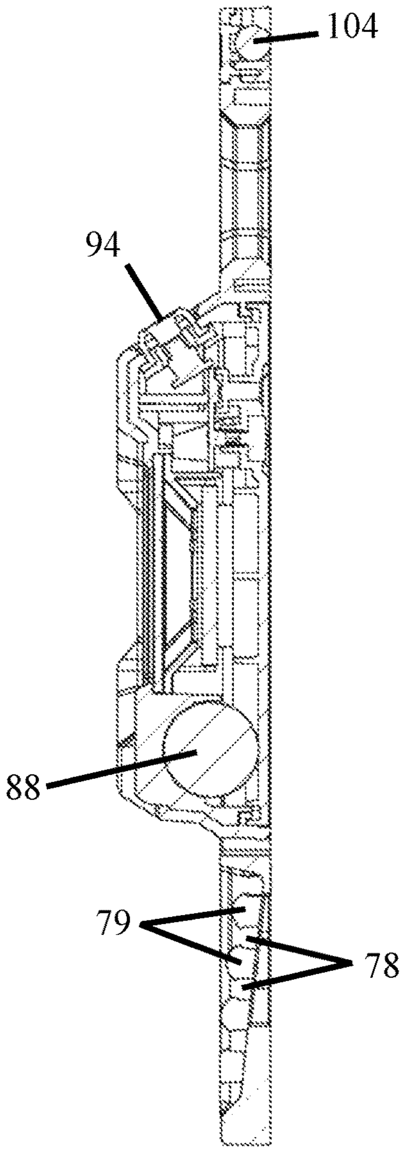
Figure 24C:
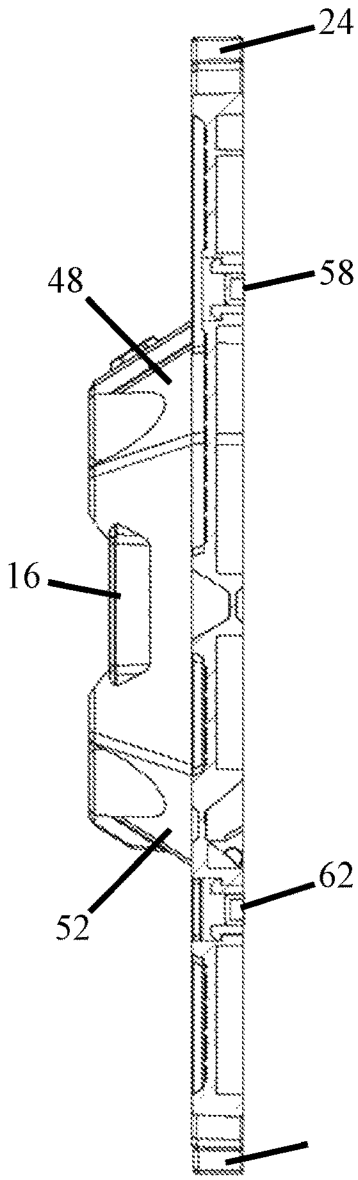
Figure 24D:
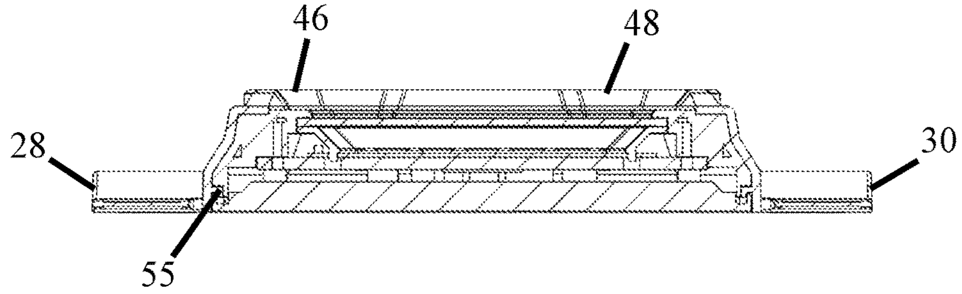

Referring to the drawings, there is shown a new and unique flexible mat light. The flexible mat light allows the light to stand on its base and be focused in multiple positions as shown in FIGS. 9A-9C; or the low-profile light can be attached to a metal surface by magnets; or the light can be configured to be carried as shown in FIG. 9D; or the light may include a hook for hanging the light near the work area. The flexible mat light is light weight and is constructed to protect the light components if the light is dropped or knocked over. A first embodiment of the flexible mat light is shown in FIGS. 1-9. A second embodiment is shown in FIGS. 10-16. A third embodiment of the flexible mat light is shown in FIGS. 17-25. A fourth embodiment is shown in FIGS. 26-32. These embodiments are substantially similar in function and differ primarily in ornamental design. The third and fourth embodiments include a hook for hanging the light in an environment of use.

Figure 25:
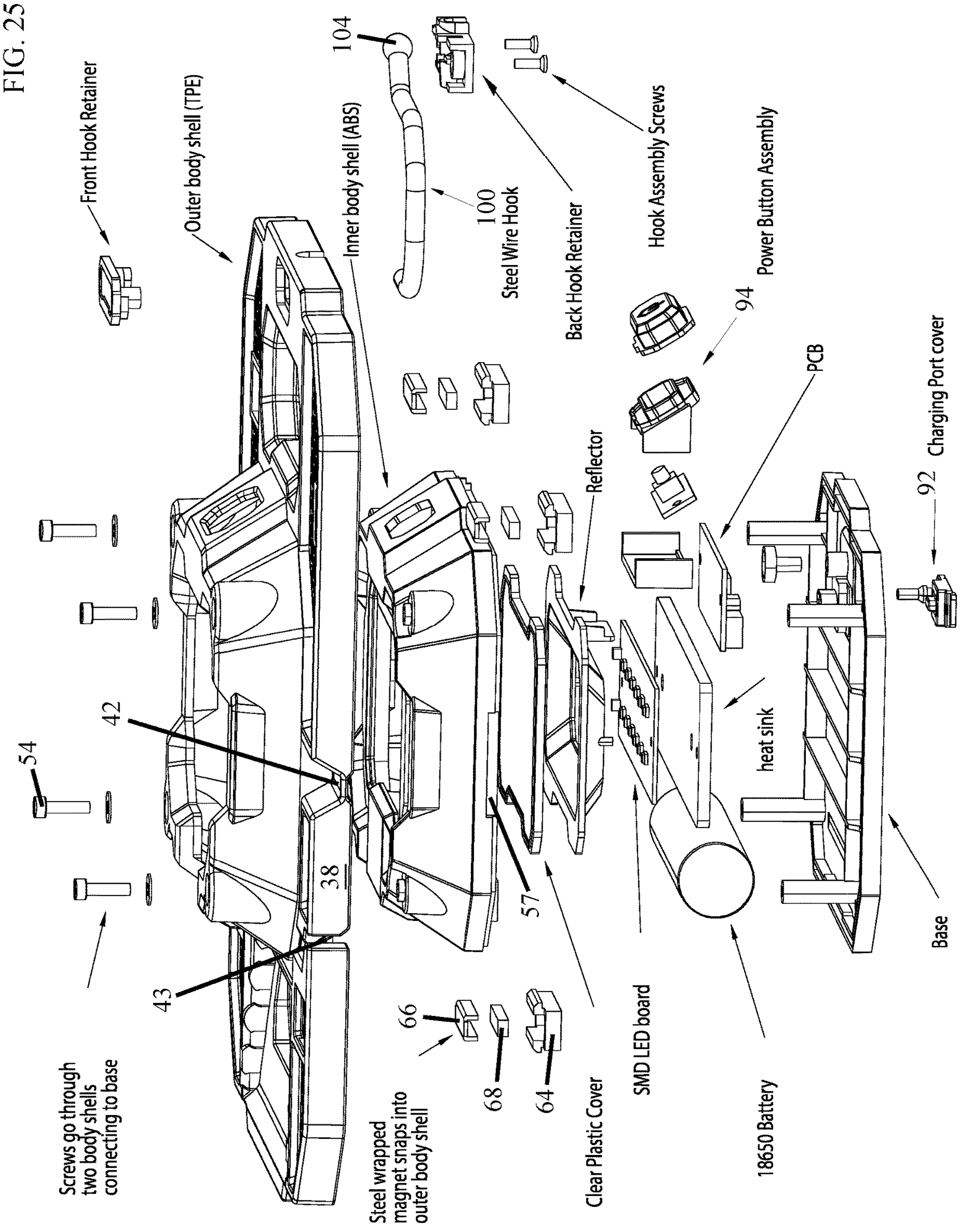
FIG. 25 is an exploded view of the light of FIG. 17.
Figure 29:
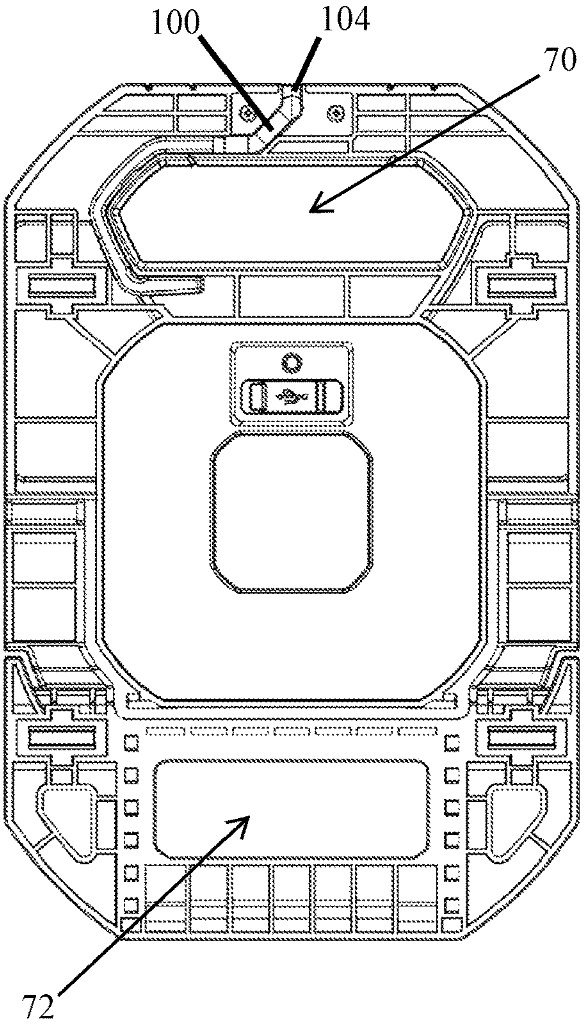
Figure 30:
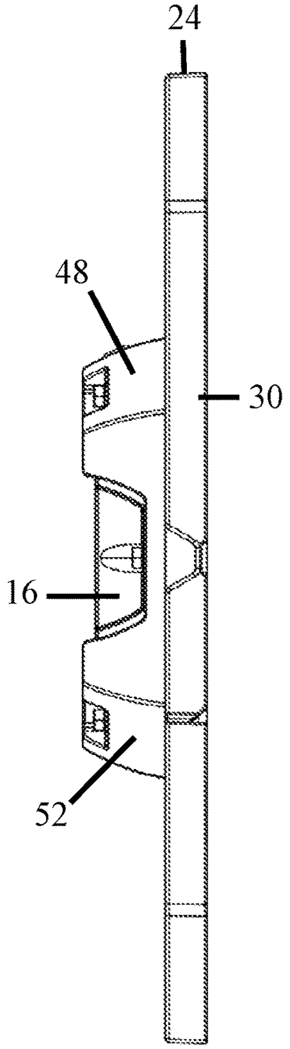
Figure 31:
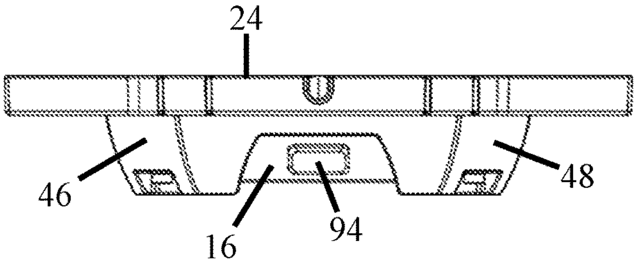
Figure 32:
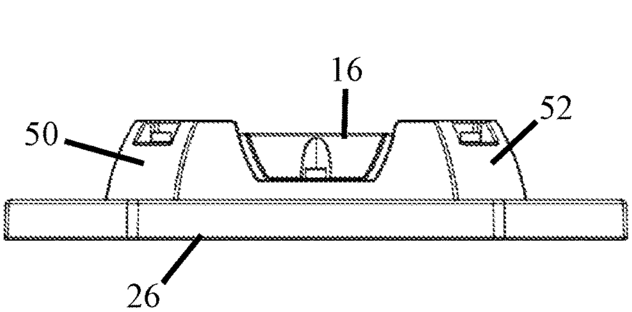

Referring to the drawings, the flexible mat light 10 includes a mat 12 and a light 14. The mat 12 is made from TPEE by injection molding. The light 14 includes an ABS housing 16 to include the light components as discussed hereafter. The mat has a front wall 20, a back wall 22, a top wall 24, a bottom wall 26, and side walls 28 and 30. The mat 12 comprises a top 32 and a base 34. Top 32 and base 34 are connected by hinges 36 and 38. Hinges 36 and 38 include two living hinges 40, 41, 42 and 43, respectively. The top 32 includes an outer shell 44 for receiving and holding the light 14 and protecting the light 14. The outer shell 44 comprises four stanchions 46, 48, 50 and 52. The light 14 is inserted from the back wall 22 into the shell 44 and will hold the light in place by fasteners 54 and, optionally, by tabs 55 in the mat 12 (FIG. 24D) which engage slots 57 in the housing 16 (FIG. 25). The upper walls of the stanchions protect the light 14 if the light is dropped or knocked over.

The top 32 of mat 12 includes two magnets 56 and 58 and the base 34 of mat 12 includes two magnets 60 and 62. The magnets in the top 32 are the same distance from the top wall and side walls as the magnets in the base are from the bottom wall and side walls. As seen hereafter, this allows the base 34 to fold by the living hinges 40 and 42 and mate with the top 32 as shown in FIG. 9D and the magnets will engage each other to provide a secure handle for carrying the device 10. The magnets comprise an outer shell 64, and within the outer shell 64 are a steel wrapper 66 and magnet 68. The magnets fit into the mat by snap fit by inserting through the opening in the back wall 22. The magnets are flush with the back wall 22 thereby allowing the flexible mat light to be attached to a metal surface.

The top 32 and base 34 each include an opening 70 and 72, respectively, which openings will mate when the base 34 is folded to attach to the top 32, as shown in FIG. 9D.

The top 32 includes arms 74 and 76 for attaching to the plurality of slots 78 in base 34 by snap fit for adjusting the light to different positions as shown in FIGS. 9A-9C. The slots 78 are defined by protuberances 79.

The light 14 includes a housing 16. The light 14 is attached to the mat by fasteners as described above. The light 14 includes in the housing 16 a lens or clear plastic cover 80, a reflector 82, an SMD board 84, a heat sink or heat shield 86, a rechargeable battery 88, a charging port assembly 90, a charging port cover 92, and an on/off power button assembly 94.

Referring to FIGS. 19, 23A, 23B and 29, the flexible mat lights of these embodiments include a hook 100 which allows the device 10 to be hung to focus the light to the work area. The hook 100 is stored in the back wall 22 of the light in a recess 102. When the hook is to be used, it rotates out of the storage position on a ball joint 104.

Referring to the different embodiments of the flexible mat lights shown in FIGS. 1, 10, 17 and 26, the primary differences are in the ornamental designs and the dimensions/shape of the devices. As noted, the embodiments in FIGS. 17 and 26 include hook 100, and this feature may be used in the devices of FIGS. 1 and 10. The devices in FIGS. 17 and 26 include an aperture 110 for hanging the devices on a peg board or the like for storage.

As seen in the drawings, the flexible mat light has a very low-profile. The dimensions for one preferred embodiment of the light are a length of about 8 to 10 inches, a width of about 5 to 7 inches, a height of about ½ inches and a height at the point of the stanchions of about 1 and ¼ inches. The living hinges allow the light to stand on base 34 as shown in FIGS. 9A-9C. FIG. 9A shows the light beginning to be placed in a standing position. FIGS. 9B and 9C show the light in two different standing positions with the arms 74 and 76 snap fit into the slots 78 of base 34.

The flexible mat light 10 may be attached to a metal surface near the work area by magnets 56, 58, 60 and 62. It is understood that a different number of magnets may be used without departing from the scope of the invention. Due to the low-profile of the flexible mat light, it is out of the way of the work area and may be used in tight work spaces.

Referring to FIG. 9D, the flexible mat light may be folded on living hinges 40 and 42 and magnets 56 and 60 and 58 and 62 engage each other to connect the top 32 to the base 34 and form a handle for grasping the light through openings 70 and 72. The light may then be carried and focused to the environment of use by the user.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A flexible mat light having a low-profile comprising a mat having a top and a base connected by one or more living hinges, a light adapted to be attached to the mat, wherein the light is adapted to be moved to a plurality of different positions based on the movement of the top in relation to the base on the one or more living hinges, and wherein the top includes at least one arm and the base includes a plurality of slots adapted to receive the at least one arm to move the light to the plurality of different positions.

2. The flexible mat light according to claim 1 wherein the mat is made of a thermoplastic polyester elastomer.

3. The flexible mat light according to claim 1 wherein there are four living hinges.

4. The flexible mat light according to claim 1 wherein the mat includes an outer shell to which the light is attached.

5. The flexible mat light according to claim 4 wherein the outer shell includes four stanchions.

6. The flexible mat light according to claim 1 wherein the top includes at least one magnet and the base includes at least one magnet, the magnets adapted to attach the flexible mat light to a metal surface.

7. The flexible mat light according to claim 6 wherein the top includes two magnets and the base includes two magnets.

8. The flexible mat light according to claim 7 wherein the two magnets of the top and the two magnets of the bottom are constructed and arranged to mate with each other when the base is folded on the at least one living hinge to mate with the top.

9. The flexible mat light according to claim 8 wherein the top includes an opening and the base includes an opening and the openings are constructed and arranged to mate when the base is folded on the at least one living hinge to mate with the top to form a handle for carrying the flexible mat.

10. A flexible mat light having a low-profile comprising a mat made of a thermoplastic polyester elastomer having a top and a base connected by two hinges, each hinge including two living hinges, the mat including an outer shell adapted to receive a light, the outer shell including four stanchions, wherein the top includes at least one magnet and the base includes at least one magnet, the magnets adapted to attach the flexible mat light to a metal surface or to each other, the light adapted to be attached to the outer shell of the mat, wherein the light is adapted to be moved to a plurality of different positions based on the movement of the top in relation to the base on the living hinges, and wherein the top includes at least one arm and the base includes a plurality of slots adapted to receive the at least one arm to move the light to the plurality of different positions.

11. The flexible mat light according to claim 10 wherein the top includes two magnets and the base includes two magnets.

12. The flexible mat light according to claim 11 wherein the two magnets of the top and the two magnets of the bottom are constructed and arranged to mate with each other when the base is folded on the at least one living hinge to mate with the top.

13. The flexible mat light according to claim 12 wherein the top includes an opening and the base includes an opening and the openings are constructed and arranged to mate when the base is folded on the at least one living hinge to mate with the top to form a handle for carrying the flexible magnetic mat.

14. A flexible mat light having a low-profile comprising a mat made of a thermoplastic polyester elastomer having a top and a base connected by two hinges, each hinge including two living hinges, the mat including an outer shell adapted to receive a light, wherein the top includes at least one arm and the base includes a plurality of slots adapted to receive the at least one arm to move the light to the plurality of different positions, wherein the top includes at least one magnet and the base includes at least one magnet, the magnets adapted to attach the flexible mat light to a metal surface or to each other, and the light adapted to be attached to the outer shell of the mat, wherein the light is adapted to be moved to a plurality of different positions based on the movement of the top in relation to the base on the living hinges.

15. The flexible mat light according to claim 14 wherein the top includes two magnets and the base includes two magnets.

16. The flexible mat light according to claim 15 wherein the two magnets of the top and the two magnets of the bottom are constructed and arranged to mate with each other when the base is folded on the living hinges to mate with the top.

17. The flexible mat light according to claim 15 wherein the top includes an opening and the base includes an opening and the openings are constructed and arranged to mate when the base is folded on the living hinges to mate with the top to form a handle for carrying the flexible magnetic mat.

* * * * *